United States Patent
Fukuda et al.

(10) Patent No.: US 9,310,177 B2
(45) Date of Patent: Apr. 12, 2016

(54) METHOD OF CORRECTING MEASUREMENT DATA OF A COORDINATE MEASURING MACHINE AND A COORDINATE MEASURING MACHINE

(75) Inventors: Mitsuru Fukuda, Utsunomiya (JP);
Kazumi Mizukami, Utsunomiya (JP);
Masao Suzuki, Utsunomiya (JP);
Takahiro Morosawa, Utsunomiya (JP)

(73) Assignee: MITUTOYO CORPORATION, Kawasaki-Shi (JP)

( * ) Notice: Subject to any disclaimer, the term of this patent is extended or adjusted under 35 U.S.C. 154(b) by 856 days.

(21) Appl. No.: 13/232,035

(22) Filed: Sep. 14, 2011

(65) Prior Publication Data
US 2012/0072156 A1 Mar. 22, 2012

(30) Foreign Application Priority Data
Sep. 17, 2010 (JP) ................................. 2010-208981

(51) Int. Cl.
*G01B 5/008* (2006.01)
*G01B 5/00* (2006.01)
*G01B 21/04* (2006.01)

(52) U.S. Cl.
CPC ............ *G01B 5/0016* (2013.01); *G01B 21/045* (2013.01)

(58) Field of Classification Search
CPC ........ G01B 5/008; G01B 5/012; G01B 5/016; G01B 21/042; G01B 21/045; G01B 21/047
USPC ............................................................. 702/95
See application file for complete search history.

(56) References Cited

U.S. PATENT DOCUMENTS

| | | | | |
|---|---|---|---|---|
| 4,724,525 A * | 2/1988 | Purcell et al. | ................. | 702/168 |
| 4,763,420 A * | 8/1988 | McCabe et al. | ................. | 33/503 |
| 5,209,131 A * | 5/1993 | Baxter | ......................... | 73/865.8 |
| 5,953,687 A * | 9/1999 | Zink et al. | ..................... | 702/168 |
| 6,622,114 B1 * | 9/2003 | Szenger et al. | ............... | 702/158 |
| 2004/0193293 A1* | 9/2004 | Watanabe et al. | ............... | 700/56 |
| 2005/0166412 A1* | 8/2005 | Ogura et al. | .................... | 33/502 |
| 2005/0166413 A1* | 8/2005 | Crampton | ...................... | 33/503 |
| 2009/0025463 A1* | 1/2009 | McFarland | ........... | G01B 21/045 73/104 |

FOREIGN PATENT DOCUMENTS

| | | |
|---|---|---|
| JP | 05-189048 | 7/1993 |
| JP | 07-146130 | 6/1995 |
| JP | 2009-288227 | 12/2009 |

* cited by examiner

*Primary Examiner* — Gregory J Toatley
*Assistant Examiner* — Michael Dalbo
(74) *Attorney, Agent, or Firm* — Rankin, Hill & Clark LLP

(57) ABSTRACT

A method according to the invention includes measuring respective geometric errors that occur in a three-dimensional movement mechanism when different weights are applied to a ram, storing in a storage section respective correction parameters for correcting the respective geometric errors measured for the different weights, inputting weight information of a probe attached to the ram, reading from the storage section one of the correction parameters that corresponds to the inputted weight information, and correcting measurement data with the read correction parameter.

1 Claim, 5 Drawing Sheets

METHOD OF CORRECTING MEASUREMENT DATA OF A COORDINATE MEASURING MACHINE AND A COORDINATE MEASURING MACHINE

The entire disclosure of Japanese Patent Application No. 2010-208981 filed Sep. 17, 2010 is expressly incorporated by reference herein.

BACKGROUND OF THE INVENTION

1. Field of the Invention

The present invention relates to a method of correcting measurement data of a coordinate measuring machine and a coordinate measuring machine. In particular, the present invention relates to a method of correcting measurement data when probes having different weights are attached to a ram of a coordinate measuring machine and a coordinate measuring machine.

2. Description of Related Art

A typical coordinate measuring machine includes a table on which an object is to be mounted, a ram that has an end attached with a probe in an exchangeable manner, and a movement mechanism that causes a relative movement between the ram and the table in a three-dimensional direction (X-, Y- and Z-axis directions).

Such a coordinate measuring machine suffers an error (geometric error) resulting from a geometric factor such as a deformation in the movement mechanism. Examples of the error are an error in the scale of each axis, an error in the horizontal straightness of each axis, an error in the vertical straightness of each axis, a pitching error in each axis, a yawing error in each axis, a rolling error in each axis and angular errors between the axes.

In order to correct such a geometric error, a coordinate measuring machine disclosed in Patent Literature 1 (JP-A-7-146130) performs volumetric measuring accuracy correction to correct an error at a reference position (datum point) defined in a ram (movement mechanism). Measurement data is calculated by compositing a probe vector (position vector) from the reference position to the position of a probe end and the corrected reference position, the probe vector being calculated by measuring a center position (reference coordinates) of a reference sphere provided in a measurement space.

Generally, various probes, such as a contact probe (e.g., a contact probe for point measurement or scanning measurement) and a non-contact probe, are selectively used depending on conditions such as the material of an object and a required accuracy. Since probes with various characteristics are different in shape and size from one another, their respective weights are also different.

Thus, in the coordinate measuring machine disclosed in Patent Literature 1, when probe exchange is carried out, an error in measurement data cannot be sufficiently corrected because the weight of the probe changes and thus the reference position also changes.

SUMMARY OF THE INVENTION

An object of the invention is to provide a method of correcting measurement data of a coordinate measuring machine and a coordinate measuring machine that are capable of solving the above problem, in other words, of appropriately correcting measurement data irrespective of probe exchange.

According to an aspect of the invention, a method of correcting measurement data of a coordinate measuring machine, the coordinate measuring machine including: a table on which an object is to be mounted; a ram that has an end attached with a probe in an exchangeable manner; and a three-dimensional movement mechanism that causes a relative movement between the table and the ram in a three-dimensional direction, the method includes: measuring respective geometric errors that occur in the three-dimensional movement mechanism when different weights are applied to the ram; storing in a storage section respective correction parameters for correcting the respective geometric errors measured for the different weights; inputting weight information of the probe attached to the ram; reading from the storage section one of the correction parameters that corresponds to the inputted weight information; and correcting the measurement data with the read correction parameter.

According to another aspect of the invention, a coordinate measuring machine includes: a table on which an object is to be mounted; a ram that has an end attached with a probe in an exchangeable manner; a three-dimensional movement mechanism that causes a relative movement between the ram and the table in a three-dimensional direction; a storage section that stores respective correction parameters for correcting respective geometric errors that occur in the three-dimensional movement mechanism when different weights are applied to the ram; an input unit through which weight information of the probe attached to the ram is inputted; and a correction calculating unit that reads from the storage section one of the correction parameters that corresponds to the weight information inputted through the input unit, and corrects measurement data with the read correction parameter.

According to the above arrangement, respective geometric errors that occur in the three-dimensional moving mechanism upon application of different weights to the ram are measured in advance (a geometric error measuring step) and respective correction parameters for correcting the respective geometric errors measured for the different weights are stored in the storage section (a correction parameter storing step).

When probe exchange is carried out prior to measurement and the weight information of the probe attached to the ram is inputted (a weight information inputting step), one of the correction parameters that corresponds to the inputted weight information is read from the storage section and the measurement data is corrected with this correction parameter (a correcting step).

In this manner, the measurement data can be appropriately corrected irrespective of probe exchange.

In the coordinate measuring machine, it is preferable that the storage section stores an identification number of the probe associated with the weight information and the correction parameters including a correction parameter corresponding to the identification number, the identification number of the probe is inputted through the input unit, and the correction calculating unit reads from the storage section the correction parameter corresponding to the identification number inputted through the input unit, and corrects the measurement data with the read correction parameter.

According to the above arrangement, when probe exchange is carried out and the identification number of the probe is inputted by the input unit, the correction parameter corresponding to the inputted identification number of the probe is read from the storage section and the measurement data is corrected with this correction parameter.

Thus, since it is not necessary to separately input the weight information of the exchanged probe, the weight information of the probe can be readily inputted. In particular, when the input unit includes an identification number barcode attached to the probe and a reader provided to the ram, to which the probe is attached, to read the identification number barcode, the measurement data can be automatically corrected upon probe exchange.

In the coordinate measuring machine, it is preferable that the input unit includes a weight sensor that measures a weight of the probe attached to the ram, and the correction calculating unit reads from the storage section one of the correction parameters that corresponds to the weight measured by the weight sensor, and corrects the measurement data with the read correction parameter.

According to the above arrangement, when probe exchange is carried out, the weight of the probe attached to the ram is measured by the weight sensor. The correction parameter corresponding to the measured weight is read from the storage section and the measurement data is corrected with this correction parameter.

Thus, since it is not necessary to separately input the weight information of the probe, the weight information of the probe can be readily inputted and the measurement data can be automatically corrected upon probe exchange.

According to still another aspect of the invention, a method of correcting measurement data of a coordinate measuring machine, the coordinate measuring machine including: a table on which an object is to be mounted; a ram that has an end attached with a probe in an exchangeable manner; and a three-dimensional movement mechanism that causes a relative movement between the table and the ram in a three-dimensional direction, the method includes: measuring a geometric error that occurs in the three-dimensional movement mechanism when a reference weight corresponding to a reference probe is applied to the ram; storing in a storage section a reference correction parameter for correcting the measured geometric error; inputting weight information of the probe attached to the ram; calculating a correction factor from the inputted weight information and the reference weight corresponding to the reference probe; calculating a correction parameter for the probe attached to the ram from the correction factor and the reference correction parameter stored in the storage section; and correcting the measurement data with the calculated correction parameter.

According to the above arrangement, when probe exchange is carried out prior to measurement and the weight information of the probe attached to the ram is inputted (the weight information inputting step), a correction factor is calculated from the inputted weight information and the reference weight corresponding to the reference probe. A correction parameter for the probe attached to the ram is calculated from the calculated correction factor and the reference correction parameter stored in the storage section and the measurement data is corrected with this correction parameter. Thus, the measurement data can be appropriately corrected irrespective of probe exchange.

In particular, according to the above arrangement, the storage section is only required to store the reference correction parameter. Thus, storing a large number of respective correction parameters for probes having various weights can be advantageously avoided.

DETAILED DESCRIPTION OF PREFERRED EMBODIMENT(S)

Figure 1:
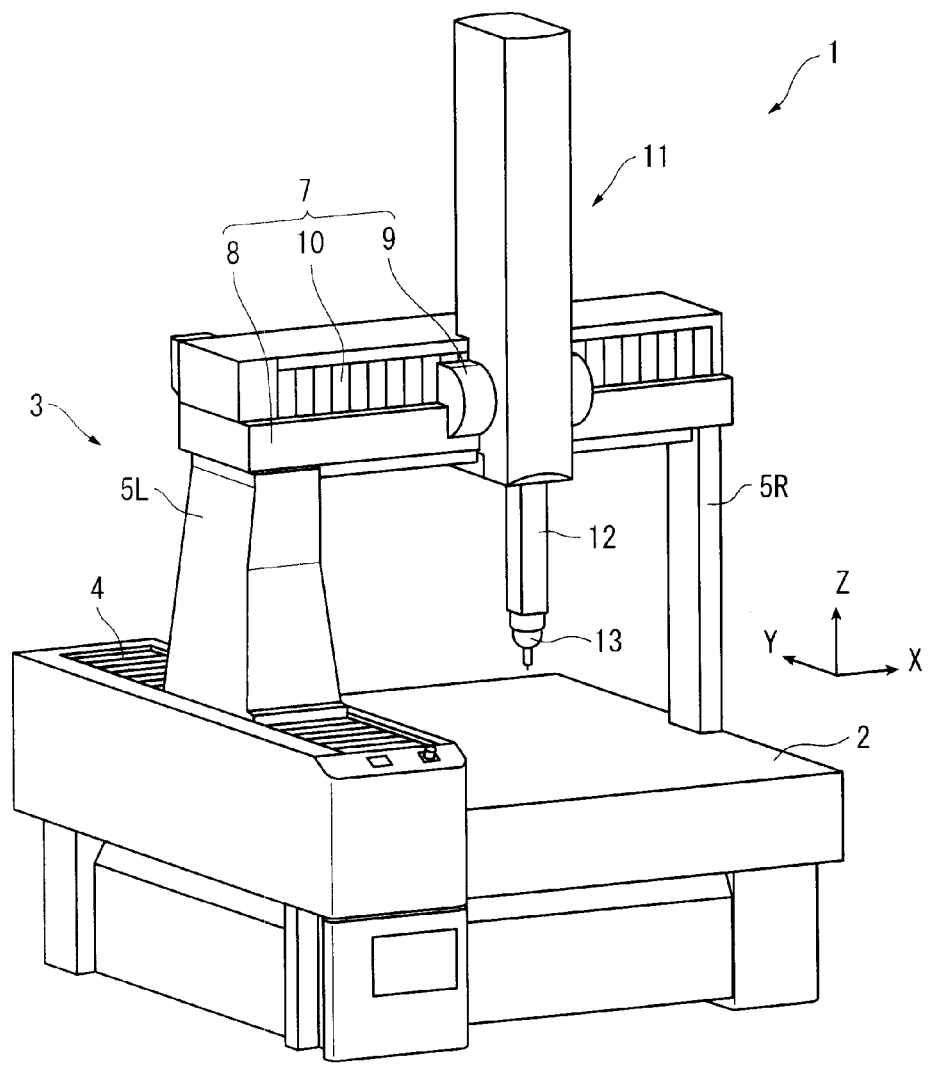
FIG. 1 is a perspective view showing a coordinate measuring machine according to an exemplary embodiment of the invention.

FIG. 1 is a perspective view showing a coordinate measuring machine according to an exemplary embodiment of the invention.

A coordinate measuring machine 1 according to the exemplary embodiment includes a table 2 on which an object is to be mounted, a ram 12 that has an end attached with a probe 13 in an exchangeable manner, and a three-dimensional movement mechanism that causes a relative movement between the ram 12 and the table 2 in a three-dimensional direction. The three-dimensional movement mechanism includes a Y-axis driving mechanism 3 that moves the probe 13 in the Y-axis direction, an X-axis driving mechanism 7 that moves the probe 13 in the X-axis direction, and a Z-axis driving mechanism 11 that moves the probe 13 in the Z-axis direction.

The table 2 is formed in a square pillar having a top surface that is precisely machined to be flat for mounting an object thereon. For the description, two directions perpendicular to each other on the top surface of the table 2 are defined as the X-axis direction (right-and-left direction) and the Y-axis direction (front-and-rear direction), respectively, and a direction perpendicular to the top surface of the table 2 is defined as the Z-axis direction (top-and-bottom direction).

The Y-axis driving mechanism 3 includes a Y-guide rail 4 provided on the table 2 in the Y-axis direction, a Y-slider 5L that is movable along the Y-guide rail 4, and a Y-slider 5R that is movable on the table 2 in the Y-axis direction along with the Y-slider 5L as a pair. Respective air bearings (not shown) are provided between the Y-guide rail 4 and the Y-slider 5L and between the table 2 and the Y-slider 5R.

The X-axis driving mechanism 7 includes an X-beam 8 that serves as a longitudinal guide member supported on the Y-slider 5L and the Y-slider 5R at both ends thereof, an X-slider 9 that serves as a movable member adapted to move in a longitudinal direction of the X-beam 8, and an X-slider driving unit 10 that moves the X-slider 9. The X-beam 8 is supported on the Y-slider 5L and the Y-slider 5R at both ends thereof. The X-beam 8 is moved in the Y-axis direction by the driving of the Y-axis driving mechanism 3.

Figure 2:
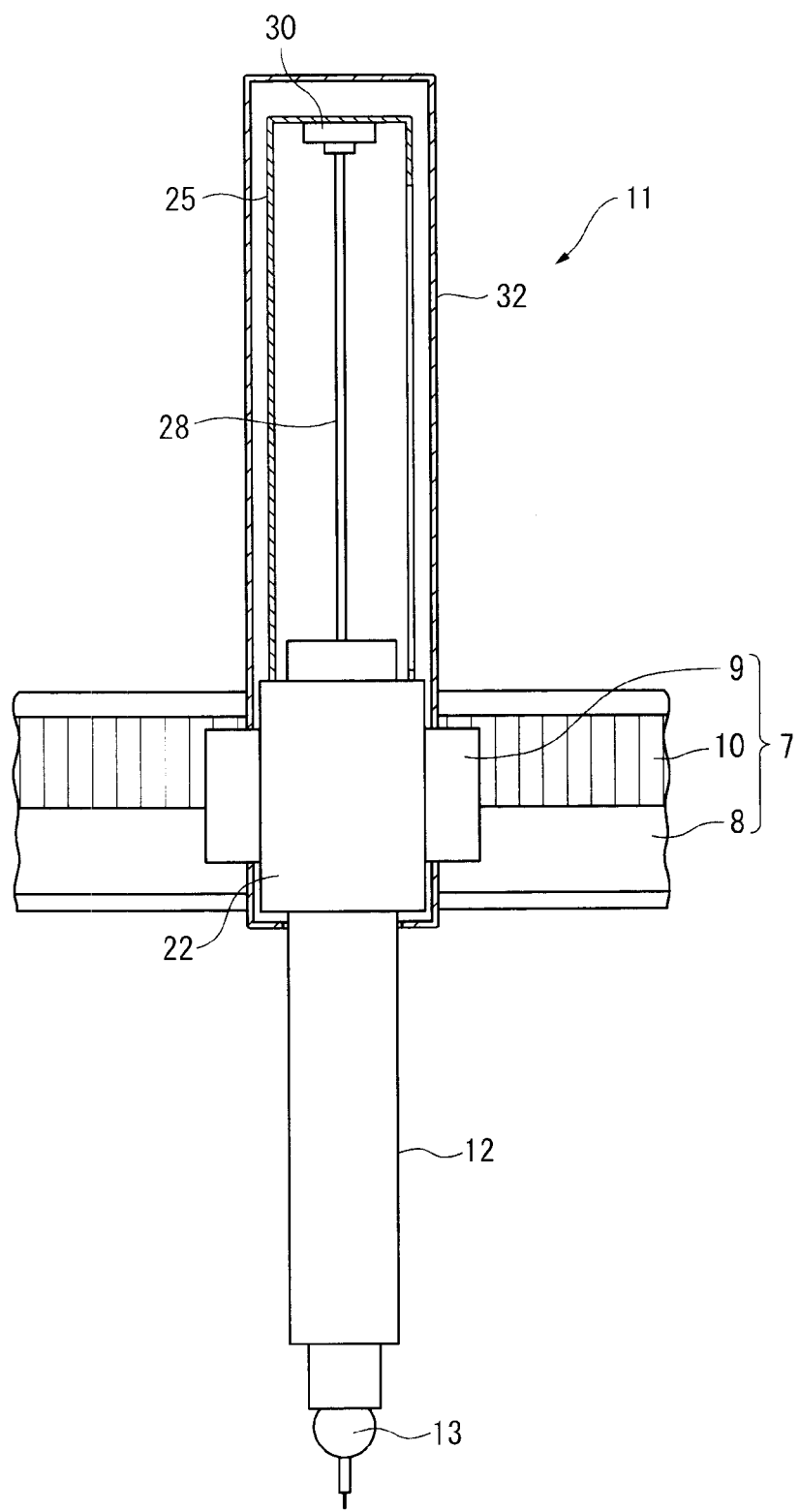
FIG. 2 is an illustration showing a ram and surrounding mechanisms thereof according to the exemplary embodiment.

As shown in FIG. 2, the Z-axis driving mechanism 11 includes a guide cylinder 22 that serves as a guide member that vertically guides the ram 12, a support shaft 28 that has an upper end being swingably supported and a lower end being coupled to a piston of an air-balance mechanism (not shown) provided in the ram 12, a column 25 that stands on the guide cylinder 22 to support the upper end of the support shaft 28, and a housing 32 that houses the guide cylinder 22, the support shaft 28 and the column 25. Attached between the column 25 and the support shaft 28 is a weight sensor 30 that serves as an input unit that measures the weight of the probe 13, i.e., the weight of the probe 13 including the ram 12 in the exemplary embodiment.

The air-balance mechanism (not shown) includes a cylinder provided in the ram 12 along the top-and-bottom direction, a piston slidably housed in the cylinder to be coupled to the support shaft 28, and a lifting force generating chamber formed as a part of a cylinder chamber defined by the piston at a side near the support shaft 28. The lifting force generating chamber generates a lifting force corresponding to the weight of the ram 12 and the probe 13, so that the ram 12 can be moved upward and downward with a small force.

Figure 3:
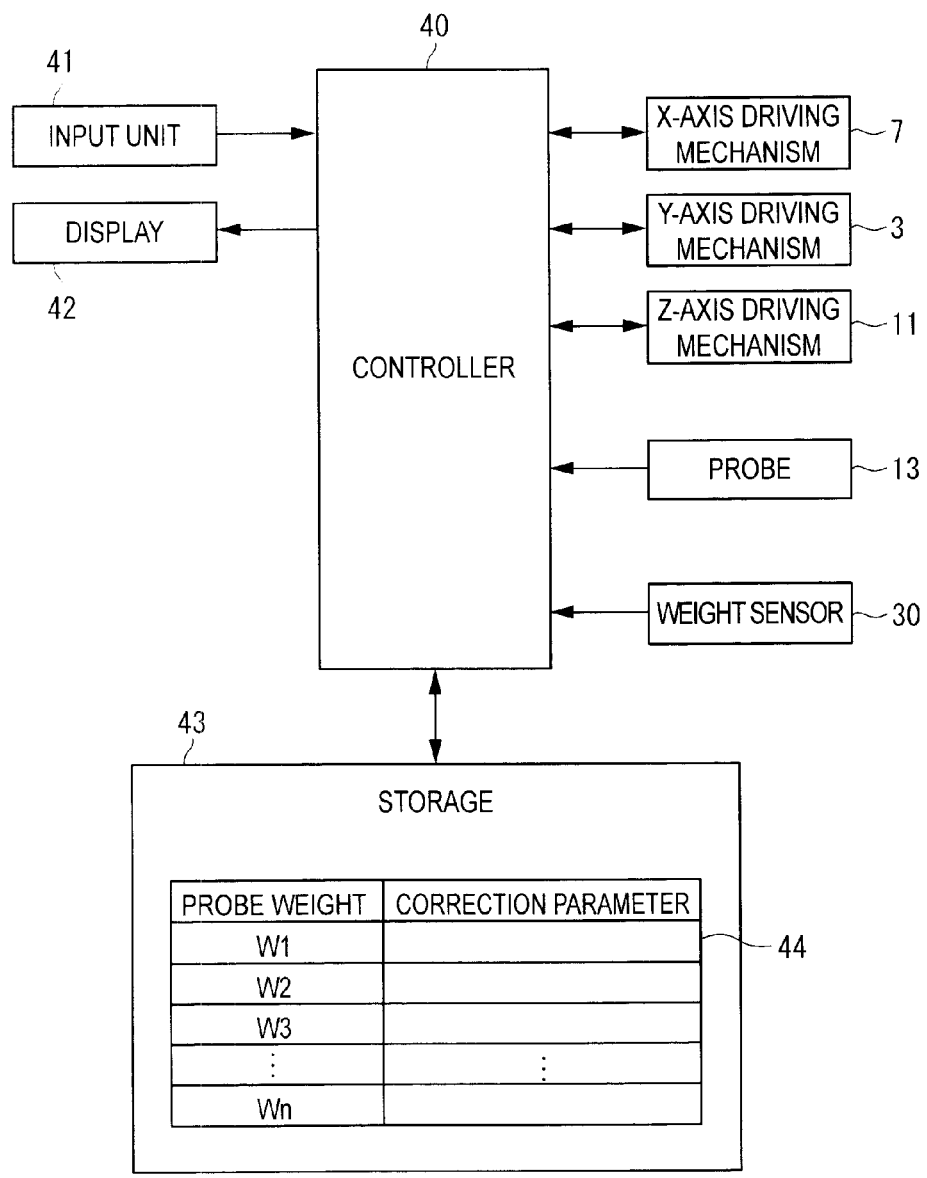
FIG. 3 is a block diagram showing a controller and mechanisms and the like connected thereto according to the exemplary embodiment.

FIG. 3 shows a control system, the center of which is a controller 40 that controls the mechanisms of the coordinate measuring machine 1.

In addition to the components of the three-dimensional moving mechanism, such as the X-axis driving mechanism 7, the Y-axis driving mechanism 3, the Z-axis driving mechanism 11, the probe 13 and the weight sensor 30, an input unit 41, a display 42 and a storage 43 are connected to the controller 40.

The input unit 41 is provided by, for instance, a keyboard, a joystick or the like, and is used to input various operation commands and data.

On the display 42, measurement data such as a shape or a dimension measured by the probe 13 is displayed.

In the storage 43, a correction parameter table 44 as a storage section is provided as well as an area for storing measurement program, measurement data and the like. The correction parameter table 44 stores respective correction parameters for correcting respective geometric errors, which occur in the three-dimensional moving mechanism when different weights W1, W2, W3 . . . Wn are applied to the ram 12, in association with the different weights W1, W2, W3 . . . Wn.

The controller 40 controls the driving of each of the X-axis driving mechanism 7, the Y-axis driving mechanism 3 and the Z-axis driving mechanism 11, reads a coordinate value of each axis (position data of the scale provided to each axis) when the probe 13 is brought into contact with an object, and performs a process for obtaining position data of the object with which the probe 13 is in contact. Further, the controller 40 serves as a correction calculating unit that is responsive to an input of weight information of the probe 13 measured by the weight sensor 30 to read one of the correction parameters that corresponds to the inputted weight information from the correction parameter table 44 and correct the measurement data with the corresponding correction parameter.

Creation of Correction Parameter Table

Figure 4:
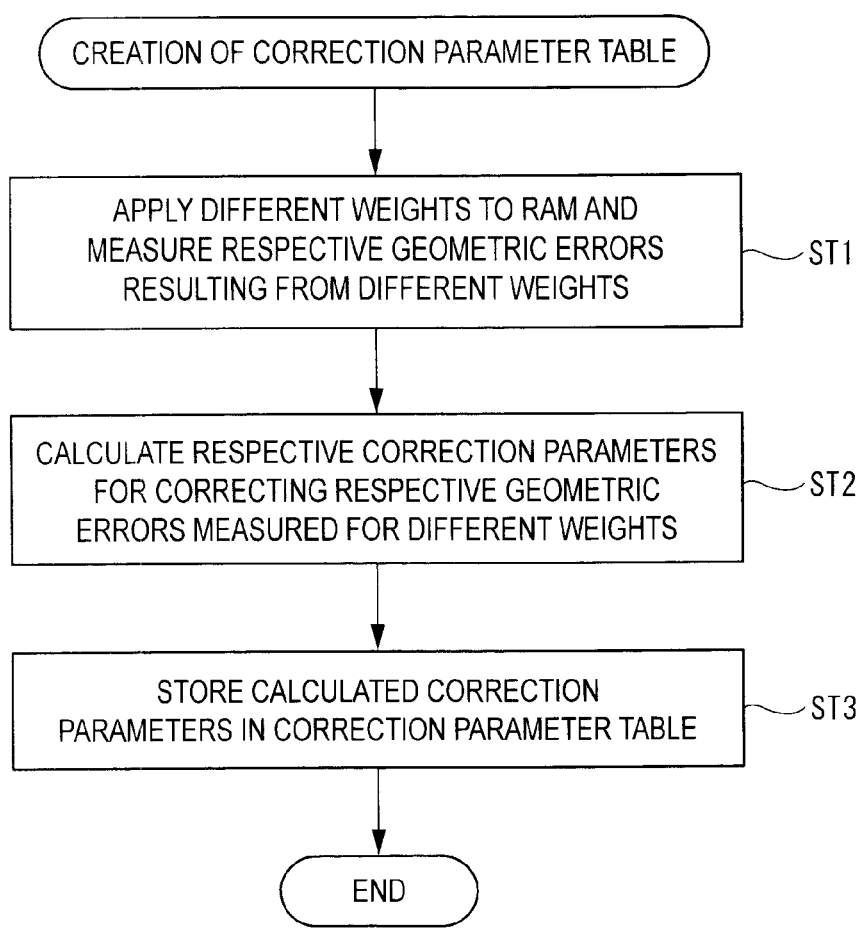
FIG. 4 is a flow chart showing a process for creating a correction parameter table according to the exemplary embodiment.

FIG. 4 shows a process for creating the correction parameter table.

Firstly, in step (hereinafter abbreviated as "ST") 1, different weights are applied to the ram 12 and respective geometric errors that occur in the three-dimensional moving mechanism upon application of the different weights are measured (a geometric error measuring step). Subsequently, in ST 2, respective correction parameters for correcting the respective geometric errors that occur in the three-dimensional moving mechanism measured upon application of the different weights in the geometric error measuring step are calculated.

Specifically, loads such as 200 g, 400 g, 600 g, 800 g and 1,000 g are applied to the end of the ram 12 and respective resulting geometric errors that occur in the three-dimensional moving mechanism are measured.

For measuring the respective geometric errors, for instance, an optical jig is set at the end of the ram 12 (each of the above-listed applied loads should include the weight of the optical jig) and a position of an end of the probe 13 relative to a scale value of each axis is measured with a laser interferometer or the like. Based on respective axial scale positions at the time when the optical jig is moved in the X-, Y- and Z-axis directions and the result of the measurement with the laser interferometer, parallel errors (an error in the scale of each axis, an error in the horizontal straightness of each axis and an error in the vertical straightness of each axis) and rotation errors (a pitching error in each axis, a yawing error in each axis, a rolling error in each axis and angular errors between the axes) are measured. By measuring the parallel errors and the rotation errors over the entire three-dimensional measurement space, it is possible to calculate the correction parameters for the entire three-dimensional measurement space.

Finally, in ST 3, the calculated correction parameters are stored in the correction parameter table 44 in association with the weights W1, W2, W3 . . . Wn (a correction parameter storing step).

Probe Exchange, Measurement and Correction

Figure 5:
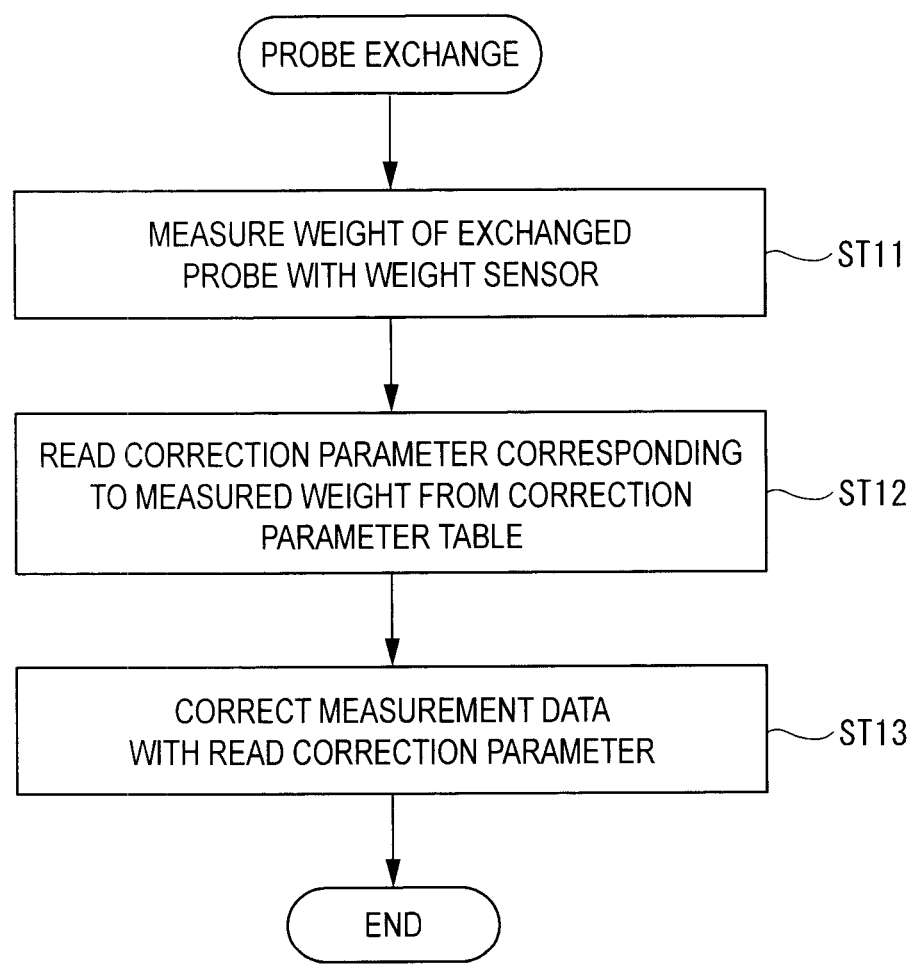
FIG. 5 is a flow chart showing a process following probe exchange according to the exemplary embodiment.

FIG. 5 shows a process accompanying probe exchange.

Prior to measurement, probe exchange is carried out. Specifically, when a new probe 13 suitable for a portion to be measured is attached to the ram 12, the weight of the exchanged probe 13 is measured by the weight sensor 30 in ST 11.

In ST 12, the controller 40 (the correction calculating unit) reads the weight of the probe 13 measured by the weight sensor 30, and reads from the correction parameter table 44 one of the correction parameters that corresponds to this weight.

Then, the controller 40 starts measurement and acquires measurement data. Specifically, after an object is mounted on the table 2, the Y-axis driving mechanism 3, the X-axis driving mechanism 7 and the Z-axis driving mechanism 11 are driven to move the probe 13 to be in contact with the object. At this time, the position of the probe 13 is read as measurement data.

In ST 13, the measurement data is corrected with the correction parameter read in ST 12 (a correcting step).

As described above, according to the exemplary embodiment, respective geometric errors that occur in the three-dimensional moving mechanism upon application of different weights to the ram 12 are measured in advance and respective correction parameters for correcting the respective geometric errors measured upon application of the different weights are stored in the correction parameter table 44. Upon probe exchange in which a new probe 13 is attached to the ram 12, the weight of the attached probe 13 is measured by the weight sensor 30. Subsequently, one of the correction parameters that corresponds to this weight is read from the correction parameter table 44 and the measurement data is corrected with this correction parameter. Thus, the measurement data can be appropriately corrected irrespective of probe exchange.

Modifications

It should be appreciated that the scope of the invention is not limited to the above exemplary embodiment but modifications and improvements that are compatible with an object of the invention are included within the scope of the invention.

Although the weight sensor 30 is provided to measure the weight of the probe 13 so that when probe exchange is carried out, the weight of the exchanged probe 13 is measured and the correction parameter corresponding to the measured weight is read from the correction parameter table 44 in the above exemplary embodiment, the invention is not limited thereto.

For instance, when probe exchange is carried out, the weight information of the exchanged probe 13 may be directly inputted through the input unit 41.

Alternatively, the storage 43 may store various information of each of plural types of probe 13 including the weight of the probe so that the weight of the exchanged probe (i.e., the probe attached to the ram 12) can be read from the information stored in the storage 43.

Alternatively, the correction parameter table 44 may store the identification number and correction parameter of the probe 13 in association with the weight information thereof, so that when the identification number is inputted through the input unit 41, the controller 40 (the correction calculating unit) reads from the correction parameter table 44 the correction parameter corresponding to the identification number of the probe inputted through the input unit 41 to correct the measurement data with this correction parameter.

With the above arrangement, since it is not necessary to separately input the weight information of the exchanged probe, the weight information of the probe can be readily inputted.

In this arrangement, when the input unit includes an identification number barcode attached to the probe 13 and a reader provided to the ram 12, to which the probe 13 is attached, to read the identification number barcode, the measurement data can be advantageously automatically corrected upon probe exchange.

Although the correction parameter is calculated for each of the weights of the probe 13 in the above exemplary embodiment, the invention is not limited to this arrangement but may employ the following arrangement.

For instance, a geometric error that occurs in the three-dimensional moving mechanism when a reference weight corresponding to a reference probe is applied to the ram 12 is measured in advance (a geometric error measuring step) and a reference correction parameter to correct the measured geometric error is stored in the storage 43 (a reference correction parameter storing step).

When the weight information of the probe 13 attached to the ram 12 is inputted upon probe exchange (a weight information inputting step), a correction factor is calculated from the inputted weight information and the reference weight corresponding to the reference probe so that the reference correction parameter stored in the storage 43 is multiplied by this correction factor to calculate a correction parameter for the probe 13 attached to the ram 12 and the measurement data is corrected with this correction parameter.

With this arrangement, since the storage 43 is only required to store the reference correction parameter, it is not necessary to store a large number of respective correction parameters for probes having various weights.

The correction parameters may be acquired for each measuring machine or, alternatively, for each series having a common structure.

Although a coordinate measuring machine in which the ram 12, to which the probe 13 is attached in an exchangeable manner, is movable in the X-, Y- and Z-axis directions is exemplified for describing the invention in the above exemplary embodiment, the invention is not limited thereto. In other words, as long as the table 2 and the ram 12 are relatively movable in a three-dimensional direction, the table 2 and the ram 12 may be movable together.

What is claimed is:

1. A method of correcting measurement data of a coordinate measuring machine by a processor for implementing the following steps, the coordinate measuring machine comprising: a table on which an object is to be mounted; a ram that has an end attached with a probe in an exchangeable manner; a three-dimensional movement mechanism that is configured to move at least one of the ram and the table in an X-axis direction, a Y-axis direction and a Z-axis direction that are perpendicular with one another to cause a relative movement between the table and the ram in a three-dimensional direction; and a controller that is configured to control the three-dimensional movement mechanism to measure a measurement data when the probe is brought into contact with the object mounted on the table, the method comprising:

measuring a geometric error that occurs in the three-dimensional movement mechanism when a reference weight corresponding to a reference probe is applied to the ram;

storing in a storage section a reference correction parameter for correcting the measured geometric error;

inputting weight information of the probe attached to the ram;

calculating a correction factor from the inputted weight information and the reference weight corresponding to the reference probe;

calculating a correction parameter for the probe attached to the ram from the correction factor and the reference correction parameter stored in the storage section; and measuring the measurement data and correcting the measurement data with the calculated correction parameter.

* * * * *